(12) United States Patent
Cole

(10) Patent No.: US 7,905,032 B2
(45) Date of Patent: Mar. 15, 2011

(54) ADJUSTABLE JIG AND TRANSFER PUNCH TOOL

(76) Inventor: Leslie Cole, Turtle Creek (CA)

( * ) Notice: Subject to any disclaimer, the term of this patent is extended or adjusted under 35 U.S.C. 154(b) by 214 days.

(21) Appl. No.: 12/385,922

(22) Filed: Apr. 24, 2009

(65) Prior Publication Data

US 2010/0115783 A1  May 13, 2010

(51) Int. Cl.
*G01B 5/00* (2006.01)
*B25D 5/00* (2006.01)
(52) U.S. Cl. .............. 33/669; 33/27.03; 33/679; 33/578
(58) Field of Classification Search .................... 33/662, 33/666, 669, 679, 574, 575, 578, 579, 27.02, 33/27.03, 27.031, 27.033, 32.1, 32.3, 41.1, 33/41.4, 501.06, 501.08, 501.09, 501.3, 520, 33/613, 644, 645
See application file for complete search history.

(56) References Cited

U.S. PATENT DOCUMENTS

| | | | |
|---|---|---|---|
| 893,562 A | 7/1908 | Ash | |
| 1,166,512 A | 1/1916 | Dannenfelser | |
| 1,422,345 A | 7/1922 | Douglas | |
| 1,619,750 A * | 3/1927 | Nelson | 33/27.031 |
| 2,332,568 A * | 10/1943 | Gauthier | 33/669 |
| 2,385,723 A * | 9/1945 | Oehrli | 33/27.03 |
| 2,419,752 A | 4/1947 | Zumbuhl | |
| 2,463,796 A | 3/1949 | O'Rourke | |
| 2,532,376 A | 12/1950 | Smith | |
| 2,537,473 A | 1/1951 | McCusker | |
| 2,539,097 A | 1/1951 | O'Rourke | |
| 2,645,022 A | 7/1953 | Hart | |
| 2,693,033 A | 11/1954 | Acker, Jr. et al. | |
| 2,821,027 A | 1/1958 | Billhimer, Sr. | |
| 2,830,378 A | 4/1958 | Givan | |
| 2,941,303 A | 6/1960 | Middlestadt | |
| 2,974,416 A | 3/1961 | Zurcher | |
| 3,289,307 A | 12/1966 | Kelly | |
| 3,483,631 A | 12/1969 | Bourgeois | |
| 3,522,658 A | 8/1970 | Howell | |
| 3,672,064 A | 6/1972 | Elkins et al. | |
| 3,816,933 A | 6/1974 | Dillinger | |
| D245,967 S | 10/1977 | Chartier | |
| 4,327,493 A | 5/1982 | Dickerson | |
| 4,353,169 A | 10/1982 | Mitchell | |
| 4,547,973 A | 10/1985 | Owens | |
| 4,730,399 A | 3/1988 | Campbell | |
| 5,235,754 A * | 8/1993 | Sirois | 33/27.03 |
| 5,509,208 A | 4/1996 | Oja | |
| 5,807,036 A | 9/1998 | Lostlen | |

* cited by examiner

*Primary Examiner* — Amy Cohen Johnson
(74) *Attorney, Agent, or Firm* — Mario Theriault

(57) ABSTRACT

The adjustable jig and transfer punch tool that a plurality of pointers wherein each pointer has a central vertical axis, an anvil portion, a mandrel portion and a swivel joint joining the anvil portion to the mandrel portion in a movable manner about the central vertical axis. Each of the anvil portion and the mandrel portion has a transverse orifice therein relative to the central vertical axis. A first and second rods extend in the transverse orifices in a first and second pair of pointers respectively, joining these pointers together such that the pointers are independently movable there along. One of the pointers in the first pair of pointers is also one of the pointers in the second pair of pointers, and the first rod is movable angularly from the second rod about the swivel joint on that common pointer.

10 Claims, 1 Drawing Sheet

ADJUSTABLE JIG AND TRANSFER PUNCH TOOL

FIELD OF THE INVENTION

This invention pertains to adjustable jig for taking measurements of distances between holes in an array of holes in an object, for transferring these dimensions to a similar object being fabricated, and for marking hole centers on the object being fabricated.

BACKGROUND OF THE INVENTION

Machine shop work often require the fabrication of a replacement part for a worn out machine or other equipment that is broken down for example. Because it is often difficult to bring the equipment to the shop, dimensions for the new part are often taken in the field. For this type of machine shop jobs for example, there is a need for a measuring instrument which can be used to obtain the measurement between bolt holes on a part to be replaced without having to take the part off the machine at that time.

The prior art contains several trammel-like instruments for taking distance between holes. The following documents provide a good inventory of the measuring devices available from the prior art:

U.S. Pat. No. 893,562 issued to H. B. Ash on Jul. 14, 1908;
U.S. Pat. No. 1,166,512 issued to F. M. Dannenfelser on Jan. 4, 1916;
U.S. Pat. No. 1,422,345 issued to W. Douglas on Jul. 11, 1922;
U.S. Pat. No. 2,419,752 issued to G. F. Zumbuhl on Apr. 29, 1947;
U.S. Pat. No. 2,463,796 issued to C. J. O'Rourke on Mar. 8, 1949;
U.S. Pat. No. 2,532,376 issued to R. Smith on Dec. 5, 1950;
U.S. Pat. No. 2,537,473 issued to R. W. McCusker on Jan. 9, 1951;
U.S. Pat. No. 2,539,097 issued to C. J. O'Rouke on Jan. 23, 1951;
U.S. Pat. No. 2,645,022 issued to J. M. Hart on Jul. 14, 1953;
U.S. Pat. No. 2,693,033 issued to H. W. Acker Jr. et al. on Nov. 2, 1954;
U.S. Pat. No. 2,821,027 issued to J. J. Billhimer, Sr. on Jan. 28, 1958;
U.S. Pat. No. 2,830,378 issued to D. E. Givan on Apr. 15, 1958;
U.S. Pat. No. 2,941,303 issued to F. J. Middlestadt on Jun. 21, 1960;
U.S. Pat. No. 2,974,416 issued to P. G. Zurcher on Mar. 14, 1961;
U.S. Pat. No. 3,289,307 issued to E. J. Kelly on Dec. 6, 1966;
U.S. Pat. No. 3,483,631 issued to R. Bourgeois on Dec. 16, 1969;
U.S. Pat. No. 3,522,658 issued to J. F. Howell on Aug. 4, 1970;
U.S. Pat. No. 3,672,064 issued to J. C. Elkins et al. on Jun. 27, 1972;
U.S. Pat. No. 3,816,933 issued to R. R. Dillinger on Jun. 18, 1974;
U.S. Pat. No. Des 245,967 issued to G. N. Chartier on Oct. 4, 1977;
U.S. Pat. No. 4,327,493 issued to L. R. Dickerson on May 4, 1982;
U.S. Pat. No. 4,353,169 issued to E. M. Mitchell on Oct. 12, 1982;
U.S. Pat. No. 4,547,973 issued to F. L. Owens on Oct. 22, 1985;
U.S. Pat. No. 4,730,399 issued to R. Campbell on Mar. 15, 1988;
U.S. Pat. No. 5,509,208 issued to C. J. Oja on Apr. 23, 1996;
U.S. Pat. No. 5,807,036 issued to Tad. K. Lostlen on Sep. 15, 1998;

The apparatus of the prior art identified above are usable for taking measurements along a straight line or in orthogonal directions only. These devices cannot be used to obtain the position of holes in an asymmetric array for example.

SUMMARY OF THE INVENTION

In the present invention, there is provided an adjustable jig and transfer punch tool that has a plurality of pointers wherein each pointer has a central vertical axis, an anvil portion, a mandrel portion and a swivel joint joining the anvil portion to the mandrel portion in a movable manner about the central vertical axis. Each of the anvil portion and the mandrel portion has a transverse orifice therein relative to the central vertical axis. A first rod extends in the transverse orifices in a first pair of pointers, joining these pointers together such that the pointers are independently movable along the rod. A second rod extends in the transverse orifices in a second pair of pointers joining the second pair of pointers together such that these two pointers in the second pair are independently movable along the second rod. One of the pointers in the first pair is also one of the pointers in the second pair of pointers, and the first rod is movable angularly from the second rod about the swivel joint on that common pointer.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the present invention is illustrated in the accompanying drawings, in which like numerals denote like parts throughout the several views, and in which.

DESCRIPTION OF THE PREFERRED EMBODIMENT

Figures 1, 2, 3, 4, 5:
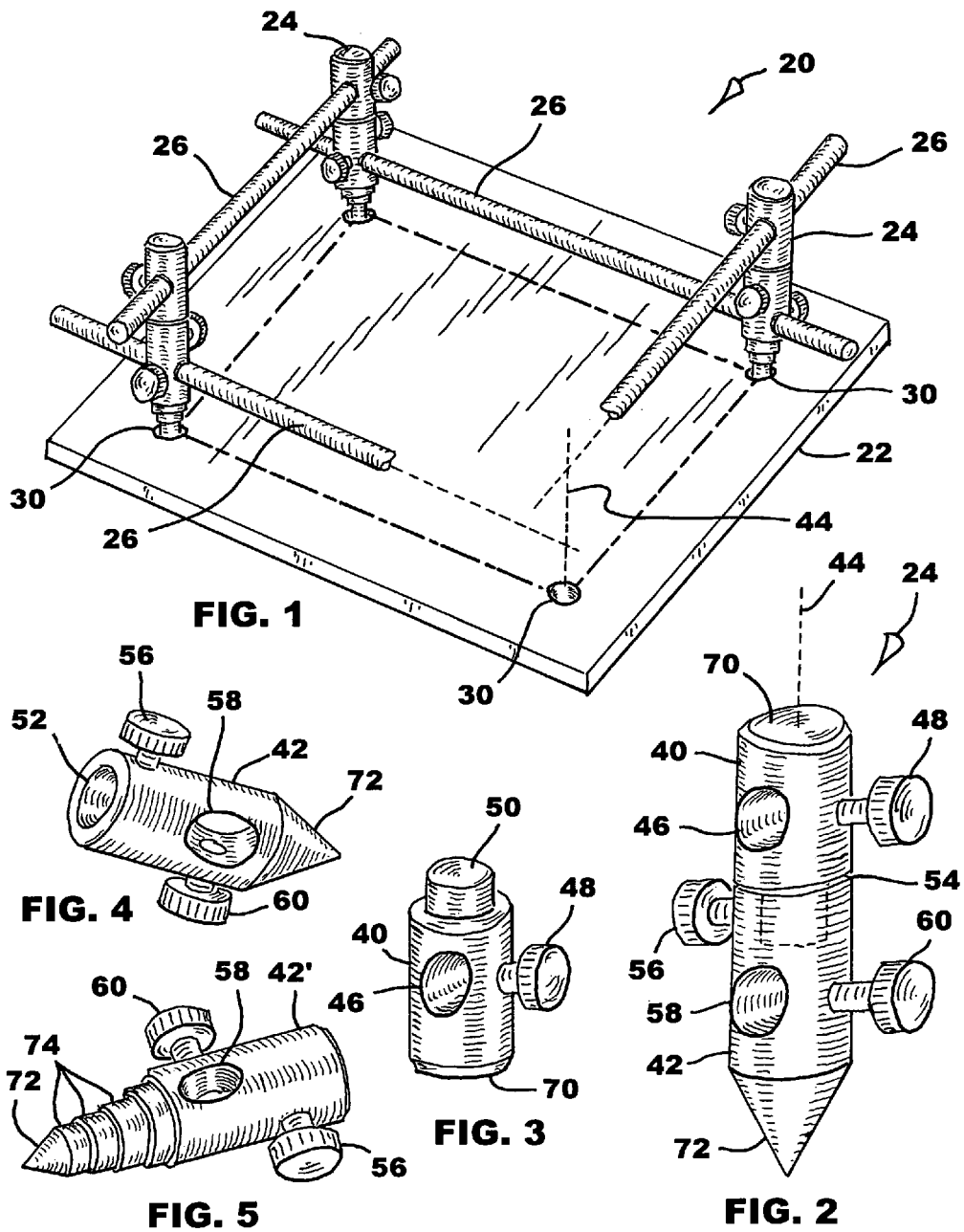
FIG. 1 is a perspective view of an adjustable jig and transfer punch tool according to a preferred embodiment of the present invention.
FIG. 2 is a perspective side and top view of an adjustable pointer used with adjustable jig and transfer punch tool according to the preferred embodiment.
FIG. 3 is a perspective side and bottom view of the anvil portion of the pointer illustrated in FIG. 2.
FIG. 4 is a perspective side and top view of a conical mandrel portion of the pointer shown in FIG. 2.
FIG. 5 is a perspective side and bottom view of a stepped mandrel portion that is optionally used in the pointer shown in FIG. 2.

Referring firstly to FIG. 1, the adjustable jig and transfer punch tool 20 according to the preferred embodiment is illustrated in use for measuring hole spacings and locations in a simplified illustration of a base plate 22. The adjustable jig and transfer punch tool 20, referred to herein as a jig 20 or adjustable jig 20 for convenience, is made of several pointers 24 joined by rods 26. The illustration shows only three pointers 24 and a four-hole array. The fourth pointer has been omitted for clarity, so one can easily perceive a hole 30 under each pointer 24. In reality, the adjustable jig 20 has a pointer 24 for each hole 30 to be measured in an array of holes.

In use, the pointers 24 are mounted on rods 26, preferably rods having a circular cross-section. The pointers 24 are positioned in the holes 30 of the array of holes to be measured. The pointers 24 are tightened to the rods 26 and the jig 20 is transferred over the piece being fabricated. Using a hammer, the pointers 24 are used as centre punches and tapped on to mark the locations of the holes to be drilled or punched out on the workpiece being fabricated.

Referring to FIGS. 2-4, each pointer 24 has an upper anvil portion 40 and a lower mandrel portion 42. Each pointer 24 has a vertical axis 44 which determines its orientation in use. The upper anvil portion 40 has a first transverse orifice 46 therein. The anvil portion 40 also has a first set screw 48 extending radially in the first orifice 46 for retaining the pointer 24 to a rod 26 extending through the first orifice 46. The anvil portion 40 also has a cylindrical boss 50 protruding from its lower end.

The mandrel portion 42 has a socket 52 in its upper end. This socket 52 has dimensions for receiving the boss 50 in a precise sliding fit manner such that when the boss 50 of the anvil portion 40 is engaged into the socket 52 of the mandrel portion 42 the engagement of the boss 50 into the socket 52 constitutes a swivel joint, which is represented by label 54 in FIG. 2.

The mandrel portion 42 has a first set screw 56 therein for locking the boss 50 of the anvil portion 40 in the socket 52 thereof, to lock the joint 54 on each pointers 24 and to retain the jig 22 fixed into the array of holes being measured. The mandrel portion 42 also has a transverse orifice 58 therein for receiving a rod 26 and a second set screw 60 for locking the mandrel portion 42 to a rod 26 extending into that orifice 58.

Each pointer 24 has an anvil head 70 for receiving a hammer blow, and a pointed lower end 72 for marking a hole center in the workpiece being fabricated.

Referring to FIG. 5, an alternate embodiment of the lower mandrel portion 42' is illustrated. The alternate mandrel portion 42' is identical to the conical mandrel portion 42 except that its conical end is made of a series of shoulders each forming a step 74 where each step has a specific diameter. This alternate mandrel portion 42' is advantageous for gauging the size of a hole in addition to determining its position relative to the other holes in an array of holes.

It will be appreciated, that because of the two-part pointer design and the swivel joint 54 between the two parts of each pointer 24 in the preferred jig 22 can be used to measure any arrays of holes that can be defined by one to four lines. The jig 22 can be used to measure hole arrays that have, S-shape, T-shape, U-shape, V-shape, Z-shape, triangular, square, rectangular and trapezoidal outlines. Several pointers 24 can also be installed on a same rod 26 for measuring holes along a linear array of holes.

What is claimed is:

1. An adjustable jig and transfer punch tool, comprising
a plurality of pointers each having a central vertical axis, an anvil portion, a mandrel portion and a swivel joint joining said anvil portion to said mandrel portion in a movable manner about said central vertical axis; each of said anvil portion and said mandrel portion having a transverse orifice therein relative to said central vertical axis;
a first rod extending in said transverse orifice in a first pair of said pointers, joining said pointers together such that said pointers are independently movable along said rod;
a second rod extending in said transverse orifice in a second pair of said pointers and joining said second pair of said pointers together such that these two pointers in said second pair are independently movable along said second rod;
wherein one of said pointers in said first pair is also one of said pointers in said second pair of pointers, and said first rod is movable angularly from said second rod about said swivel joint of said one of said pointers.

2. The adjustable jig and transfer punch tool as claimed in claim 1, further comprising a set screw extending into each of said transverse orifice for retaining said pointers to said rods.

3. The adjustable jig and transfer punch tool as claimed in claim 1, wherein each of said mandrel portion has a conical lower end.

4. The adjustable jig and transfer punch tool as claimed in claim 1 wherein said mandrel has a series of shoulders forming steps thereon for gauging a diameter of holes to be measured therewith.

5. The adjustable jig and transfer punch tool as claimed in claim 1 wherein said swivel joint includes a set screw for blockage thereof.

6. The adjustable jig and transfer punch tool as claimed in claim 1 wherein said anvil portion has an anvil head for receiving a hammer blow and said mandrel portion has a pointed lower end for marking a workpiece.

7. The adjustable jig and transfer punch tool as claimed in claim 1, wherein said rods have a circular cross-section.

8. The adjustable jig and transfer punch tool as claimed in claim 1, further comprising a third rod joining one of said pointers in said first pair of pointers to one of said pointers in said second pair of pointers.

9. The adjustable jig and transfer punch tool as claimed in claim 8, further comprising a fourth rod joining one of said pointers in said first pair of pointers to one of said pointers in said second pair of pointers.

10. The adjustable jig and transfer punch tool as claimed in claim 9 wherein said first, second, third and fourth rods defining a square outline.

\* \* \* \* \*